Nov. 10, 1925.
E. J. HARVEY
1,561,074
BUMPER
Filed March 24, 1924
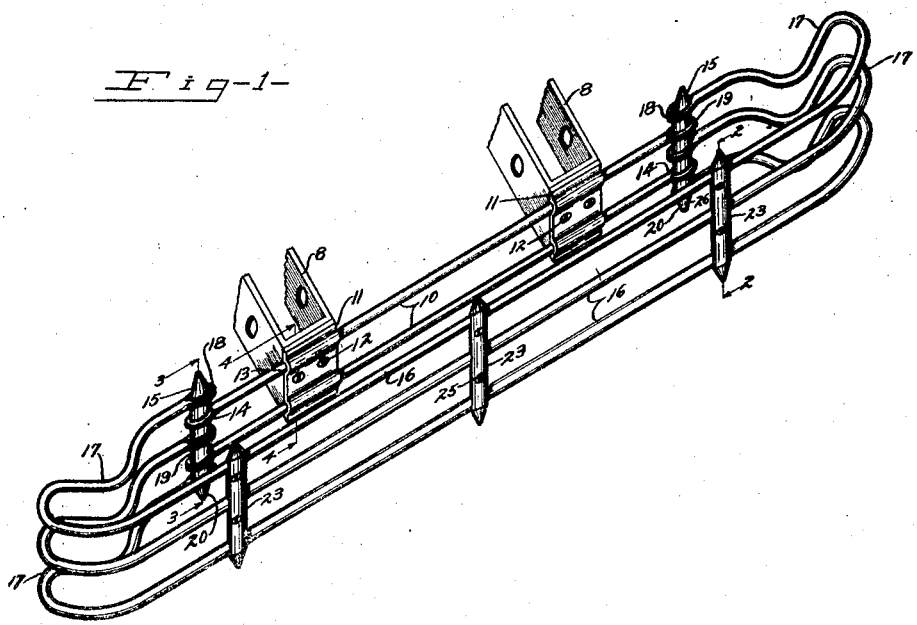
INVENTOR.
Edward J. Harvey,
BY
Morsell, Reeney & Morsell,
ATTORNEYS.

Patented Nov. 10, 1925.

1,561,074

UNITED STATES PATENT OFFICE.

EDWARD J. HARVEY, OF RACINE, WISCONSIN.

BUMPER.

Application filed March 24, 1924. Serial No. 701,436.

*To all whom it may concern:*

Be it known that I, EDWARD J. HARVEY, a citizen of the United States, and resident of Racine, in the county of Racine and State of Wisconsin, have invented new and useful Improvements in Bumpers, of which the following is a description, reference being had to the accompanying drawings, which are a part of this specification.

This invention relates to improvements in bumpers for motor cars and more particularly to that type designed to be attached to the front and rear portions of the vehicle to protect the same and cushion the shock or impact in accidentally striking an object or being struck by another vehicle.

It is one of the objects of the present invention to provide a bumper which is exceedingly simple in construction, is inexpensive to manufacture and is efficient in use.

A further object of the invention is to provide a bumper constructed to equalize the strain of striking an object or of being struck by another vehicle so that the strains will be distributed to all portions of the bumper.

A further object of the invention is to provide a bumper which is made of lengths of commercial spring steel rods combined in a very simple manner to form a resilient member which absorbs to a large extent the shock of accidental impact with an object.

A further object of the invention is to provide a bumper formed of commercial spring steel rods combined to form an ornamental structure and having pivotal portions to transmit strains to all portions of the bumper.

A further object of the invention is to provide a bumper which is of very simple formation is strong and durable and is well adapted for the purpose described.

With the above and other objects in view the invention consists of the improved bumper and its parts and combinations as set forth in the claims, and all equivalents thereof.

In the accompanying drawing in which the same reference characters indicate the same parts in all of the views:

Fig. 1 is a perspective view of the improved bumper with portions of the supporting brackets shown;

Fig. 2 is a sectional detail view taken on line 2—2 of Fig. 1;

Fig. 3 is a sectional detail view taken on line 3—3 of Fig. 1; and

Fig. 4 is a sectional detail view taken on line 4—4 of Fig. 1.

Referring to the drawing the numeral 8 indicates the supporting brackets which are adapted to be connected to the side bars of an automobile frame in any manner desired. Said brackets are of U-shape and are provided with spaced horizontal grooves 9 for receiving the rear bars 10 of the bumper. Bracket caps 11 mounted on the front faces of the brackets by screws 12 are also provided with horizontal grooves 13 which are in register with the grooves 9 to clamp the bars 10 therebetween. The rear bars 10 have eyes 14 formed at their opposite ends which receive vertically extending bolts 15 therethrough. Resilient bumper members or rods 16 spaced vertically with relation to each other and spaced forwardly of the rear bars 10 are curved rearwardly towards their ends and then curved to form return bends 17 and at their inturned ends are formed with eyes 18 which are in register with the eyes 16 and through which the bolts 15 extend. Washers 19 are positioned between the eyes of the bumper rods and the eyes of the rear rods and the bolts 15 also extend through said washers to clamp all of the parts together. Nuts 20 are threaded on the lower ends of the bolts 15 and are provided with openings 20 which are in register with openings 21 in the bolts to receive cotter pins 22 therethrough to lock the nuts in adjusted position. The front portions of the bumper rods 16 are firmly held in spaced relation by two part clip members 23 which are equidistantly spaced apart and extend vertically as shown. Said clip members are preferably round in cross-section to conform to the rods and each half section is provided with transverse grooves 24 to receive the rods 16 and said clips are clamped to the rod by screws 25 which draw the sections together.

The clips and the bolts and the nuts are formed with conical ends 26 to give an ornate and finished appearance to the bumper.

It is to be understood that the bumper may be formed with any number of bumper rods or rear rods without departing from the spirit and scope of the invention.

Particular attention is directed to the fact that almost the entire bumper is formed of commercial spring steel rods and that as all openings are round they may be easily drilled and the parts be easily connected together.

In operation the pivotal connections of the ends of the front bumper bars with the ends of the rear bars permit the return bend portions of the front rods and also the end portions of the rear rods to give rearwardly under strain so that if one end of the bumper is forced rearwardly the front will bow forwardly and the opposite end swing forwardly thus equalizing the strain and resistance throughout the entire bumper.

The construction also provides for easily replacing any of the bars which might become damaged.

From the foregoing description it will be seen that the invention is well adapted for the purpose described.

What I claim as my invention is:

1. A bumper, comprising brackets, spaced rear rods connected to the brackets and projecting outwardly therefrom, resilient front rods having return bend end portions which are connected to the ends of the rear rods and are spaced forwardly of said rear rods, and spacing clips connecting the front rods together in spaced relation.

2. A bumper, comprising brackets, spaced rear rods connected to the brackets and having eyed ends, resilient front rods having return bend end portions which are connected to the eyed ends and are spaced forwardly of said rear rods, and spacing clips connecting the front rods together in spaced relation.

3. A bumper, comprising brackets, spaced rear rods connected to the brackets and having eyed ends, resilient front rods, positioned in front of the rear rods and having return bend end portions formed with eyed ends which are in register with the eyed ends of the rear rods, bolts extending through said registering eyed ends to pivotally connect the eyes together, and spacing clips connecting the front rods together in spaced relation.

4. A bumper, comprising brackets, spaced resilient round rods connected to the brackets and having eyed ends projecting outwardly therefrom, resilient round front rods positioned in front of the rear rods and having return bend end portions formed with eyed ends which are in register with the eyed ends of the rear rods, bolts extending through said registering eyes to pivotally connect the rods together, and vertically extending spacing clips connecting the front rods together in spaced relation.

5. A bumper, comprising brackets having horizontally extending grooves, spaced resilient round rods extending through the grooves and having eyed ends, grooved cap member secured to the brackets for clamping the rods therebetween, resilient round front rods positioned in front of the rear rods and having return bend end portions formed with eyed ends which are in register with the eyed ends of the rear rods, washers interposed between said eyed ends, bolts extending through the eyed ends and the washers for pivotally connecting the parts together, and two-parts spacing clips connecting the front rods together in spaced relation.

In testimony whereof, I affix my signature.

EDWARD J. HARVEY.